(12) United States Patent
Harvey

(10) Patent No.: US 10,370,126 B1
(45) Date of Patent: Aug. 6, 2019

(54) SOLAR PANEL ARRAY ASSEMBLY

(71) Applicant: MMA Design, LLC, Boulder, CO (US)

(72) Inventor: Thomas Jeffrey Harvey, Nederland, CO (US)

(73) Assignee: M.M.A. DESIGN, LLC, Louisville, CO (US)

( * ) Notice: Subject to any disclaimer, the term of this patent is extended or adjusted under 35 U.S.C. 154(b) by 569 days.

(21) Appl. No.: 14/312,661

(22) Filed: Jun. 23, 2014

Related U.S. Application Data

(63) Continuation-in-part of application No. 12/807,565, filed on Sep. 8, 2010, now Pat. No. 8,757,554.

(60) Provisional application No. 61/276,197, filed on Sep. 9, 2009.

(51) Int. Cl.
*B64G 1/44* (2006.01)

(52) U.S. Cl.
CPC .................................... *B64G 1/443* (2013.01)

(58) Field of Classification Search
CPC ...................................................... B64G 1/443
USPC .................................................. 136/243–265
See application file for complete search history.

(56) References Cited

U.S. PATENT DOCUMENTS

| | | |
|---|---|---|
| 3,677,508 A | 7/1972 | Dillard et al. |
| 3,733,758 A | 5/1973 | Maier et al. |
| 4,148,163 A | 4/1979 | Chenin et al. |
| 4,155,524 A | 5/1979 | Marello et al. |
| 5,319,905 A | 6/1994 | Szirtes |
| 5,520,747 A | 5/1996 | Marks |
| 5,785,280 A * | 7/1998 | Baghdasarian ........ B64G 1/222 136/245 |
| 5,885,367 A | 3/1999 | Brown et al. |
| 5,927,654 A | 7/1999 | Foley et al. |
| 5,961,738 A * | 10/1999 | Benton ................... B64G 1/44 136/245 |
| 6,008,447 A | 12/1999 | Meurer et al. |
| 6,017,002 A | 1/2000 | Burke et al. |
| 6,031,178 A | 2/2000 | Kester |
| 6,050,526 A | 4/2000 | Stribling, Jr. |
| 6,147,294 A * | 11/2000 | Dailey ................... B64G 1/222 136/245 |
| 6,175,989 B1 * | 1/2001 | Carpenter ............. B64G 1/222 136/245 |

(Continued)

OTHER PUBLICATIONS

Clyde-Space; 1U Single Deployed Solar Panel (short edge), <www.clyde-space.com/cubesat_shop/solar_panels>, Circa 2008?.

(Continued)

*Primary Examiner* — Dustin Q Dam
(74) *Attorney, Agent, or Firm* — Christopher J. Kulish

(57) ABSTRACT

A solar panel array assembly is provided that is adapted to transition between a stowed condition in which at least two solar panels are stacked and a deployed condition in which the solar panels are unstacked relative to the stowed condition and that exhibits a low-profile when in the stowed condition. In one embodiment, the assembly includes at least two solar panels, a flexible hinge connecting and extending between the panels that allows relative rotation of the panels to one another, a torsion bar for providing the force for causing the rotation of the panels for the transition between the stowed and deployed conditions, and a truss structure that transitions from a relatively flat, inoperative state when the panels are stowed to an operative state for use with deployed panels.

7 Claims, 15 Drawing Sheets

(56) References Cited

U.S. PATENT DOCUMENTS

| | | | |
|---|---|---|---|
| 6,334,235 B2 | 1/2002 | Duperray et al. | |
| 6,429,368 B1 | 8/2002 | Summers | |
| 6,655,638 B2 | 12/2003 | Deel | |
| 6,772,479 B2 | 8/2004 | Hinkley et al. | |
| 6,888,513 B1 | 5/2005 | Graham et al. | |
| 6,889,411 B2 | 5/2005 | Hinkley et al. | |
| 7,093,804 B2 | 8/2006 | Desagulier et al. | |
| 7,211,722 B1 | 5/2007 | Murphy | |
| 7,278,612 B1 | 10/2007 | Munder | |
| 7,806,370 B2 | 10/2010 | Beidlemn et al. | |
| 8,035,573 B2 | 10/2011 | Thompson et al. | |
| 8,061,660 B2 | 11/2011 | Beidleman et al. | |
| 8,066,227 B2 | 11/2011 | Keller et al. | |
| 8,308,111 B2 | 11/2012 | Lu et al. | |
| 2003/0164186 A1* | 9/2003 | Clark | B64G 1/222 136/245 |
| 2005/0156083 A1 | 7/2005 | Chaix et al. | |
| 2007/0262204 A1 | 11/2007 | Beidleman et al. | |
| 2008/0104890 A1* | 5/2008 | Starheim | E06B 3/01 49/346 |
| 2010/0051083 A1* | 3/2010 | Boyk | F24J 2/248 136/244 |
| 2010/0163684 A1 | 7/2010 | Dando et al. | |
| 2011/0204186 A1 | 8/2011 | Keller et al. | |
| 2012/0024342 A1 | 2/2012 | Kalman | |
| 2012/0325974 A1 | 12/2012 | Baudasse et al. | |

OTHER PUBLICATIONS

Wikipedia; Planetary Society LightSail-1; <http://en.wikipedia.org/w/index.php?oldid=530006872>; Circa 2008.

Conversano et al.; CubeSat Lunar Mission Using a Miniature Ion Thruster; Department of Mechanical and Aerospace Engineering, University of California, Los Angeles; 47th AIAA/ASME/SAE/ASEE Joint Propulsion Conference and Exhibit, Jul. 31-Aug. 3, 2011.

* cited by examiner

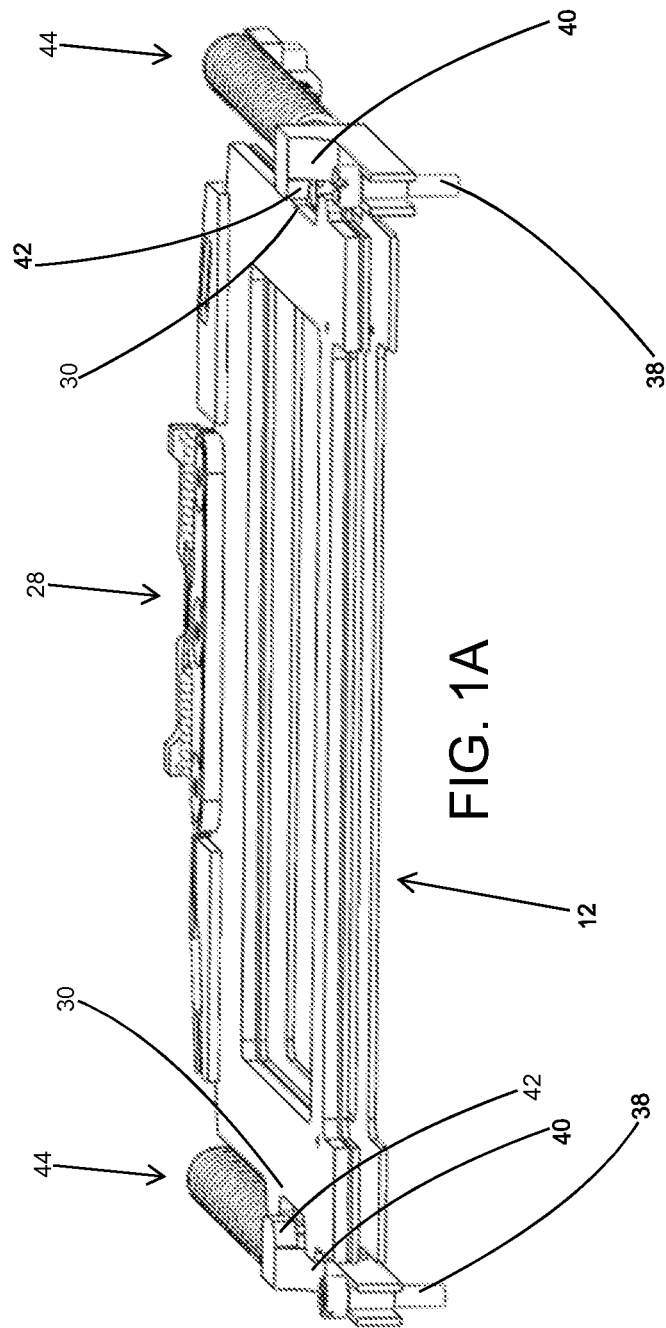

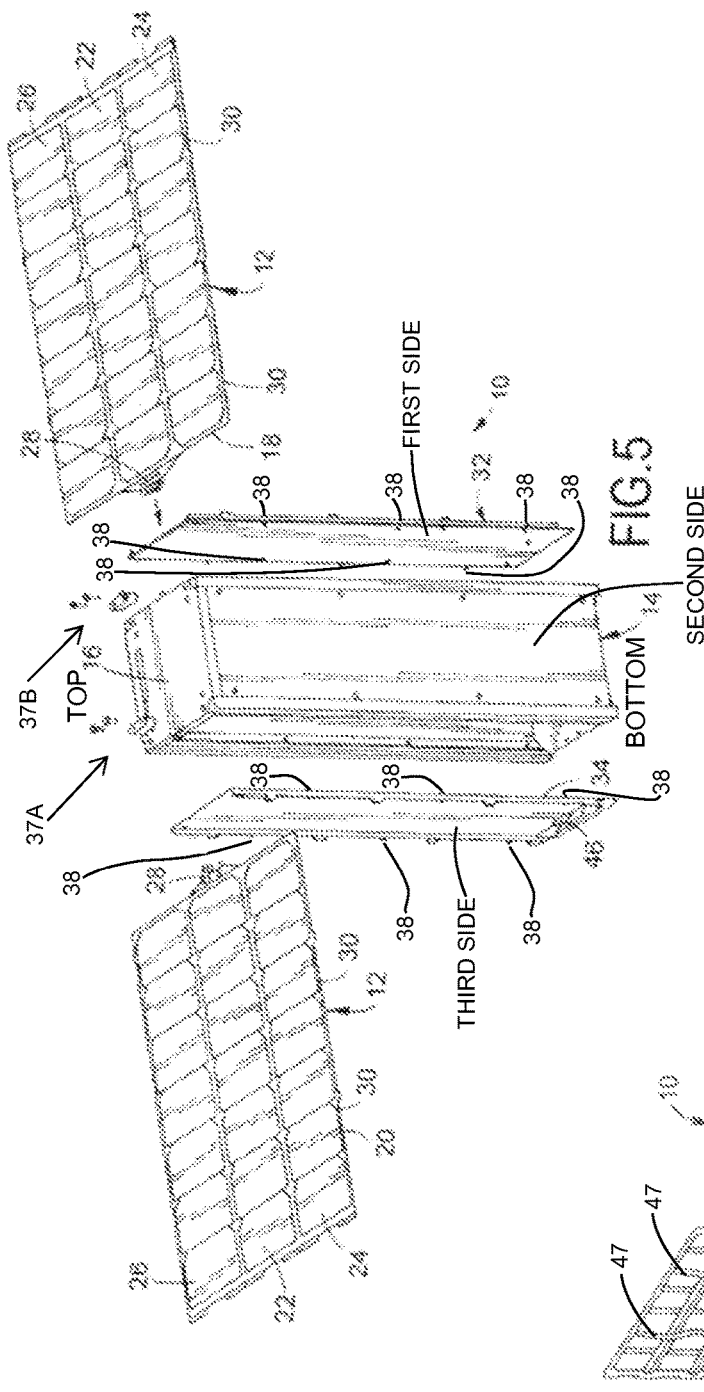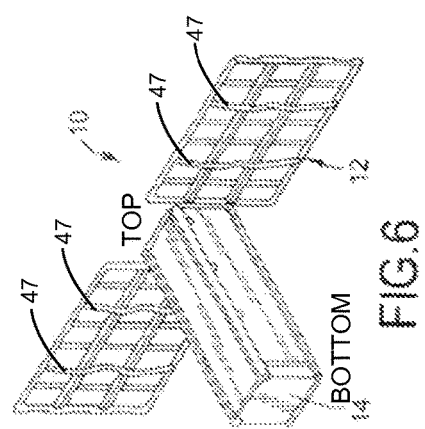

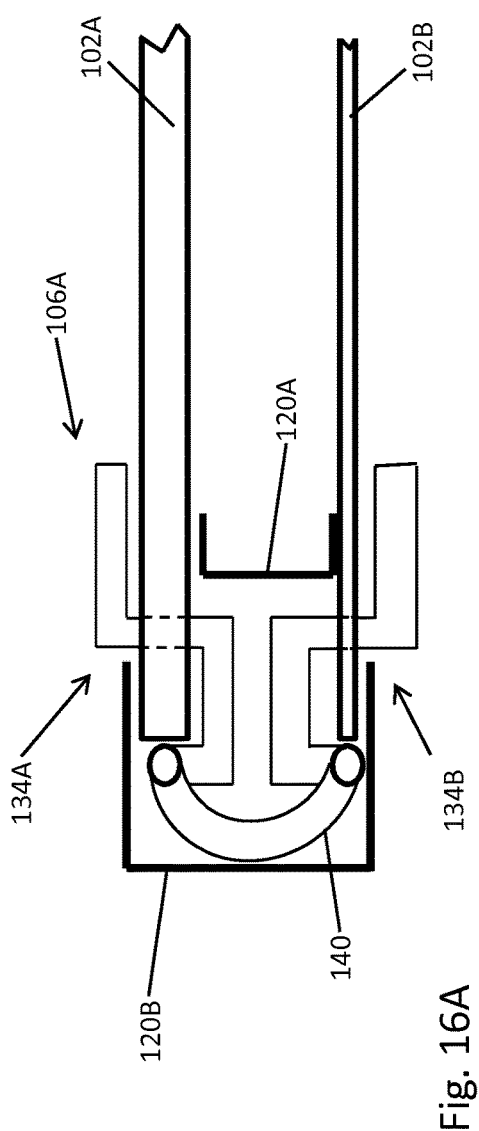
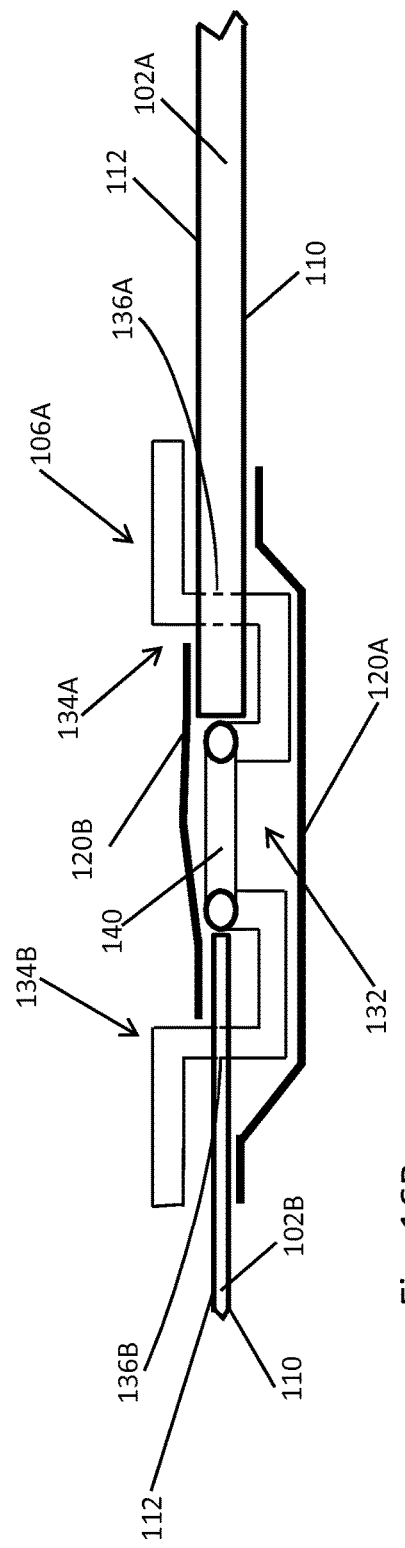

SOLAR PANEL ARRAY ASSEMBLY

FIELD OF THE INVENTION

The invention relates to a solar panel array structure and, more specifically, to a solar panel array structure comprised of multiple solar panels that can be folded together so as to have a relatively low-profile when in a stowed or stacked configuration.

BACKGROUND OF THE INVENTION

CubeSats are cube-shaped satellites with nominal dimensions of 10 cm on each side. Frequently, two or more CubeSats are stacked together to form a satellite. In one configuration three CubeSats are stacked together to form a three unit (3 U) satellite with nominal dimensions of 10 cm×10 cm×30 cm. CubeSats are deployed from a canister structure with interior sides that are each 6.5 mm from each face of the CubeSat. This space, while relatively small, can be used to accommodate add-ons to the CubeSat. For example, in the case of a 3 U CubeSat this space has been used to accommodate solar array assemblies that are used to power the CubeSat when in orbit. One known solar array assembly used with a 3 U CubeSat includes four solar panel arrays each of which is associated with one of the 10 cm×30 cm sides of the CubeSat and hinged at a location adjacent to the top face of the CubeSat. Typically, each panel can accommodate seven solar cells. After the CubeSat is deployed from the canister, the hinges operate to bring the four panels into a cross-like configuration with a total of twenty-eight solar cells.

Other known types of solar assemblies used with satellites employ a plurality of solar panels with hinges extending between the panels that allow the panels to be placed in a stacked or stowed configuration and subsequently deployed such that the panels are typically disposed in a plane configuration. The solar panels are typically comprised of an array of solar cells and a honeycomb-core panel that supports the array of solar cells. The honeycomb-core panels typically range in thickness from 0.32 cm (⅛") to 3.8 cm (1.5"). The hinges employed in many cases are of the type or very similar to the hinges employed in building and architectural applications. Such hinges include (a) a pair of rigid wings, each of which is connected to one of the two objects that are connected by the hinge and defines part of a barrel and (b) a pin that passes through the barrel formed by the two wings to connect the two wings and allow the two wings to pivot about the pin. Torsion springs are commonly employed to store the energy needed to move the solar panels from a stacked or stowed state to a deployed state. Such a torsion spring is typically realized with a cylindrical coil of wire with the two ends of the wire extending outward from the coil to engage two adjacent panels. Such hinges typically are significant factors in the height or profile of the solar assembly when the panels are in a stacked or stowed configuration.

SUMMARY OF THE INVENTION

The present invention is a deployable and tracked solar array mechanism for restraining and releasing deployable solar panel arrays on a spacecraft. The mechanism comprises a solar array drive assembly mountable to the top side surface (10 cm×10 cm) of the spacecraft. A solar panel arrays is pivotally attached to the solar array drive and positionable against the 30 cm×10 cm faces of the spacecraft. At least one notch is formed in at least one of the side edges of the solar panel arrays. A frame is slidably mounted to the spacecraft around the solar panel arrays. At least one tab extends from the frame over the solar panel arrays and releasably restrains the solar panel arrays. A spring mechanism urges the frame in a direction generally away from the solar array drive assembly. A release mechanism holds the frame against the force of the spring means wherein upon initiation of deployment, the release mechanism disintegrates allowing the spring means to slidably urge the frame in a general direction away from the solar array drive assembly thereby aligning the notches (at least one) with the frame tab thus releasing the solar panel arrays from being restrained against the spacecraft.

In addition, the present invention includes a method for restraining and releasing deployable solar panel array on a spacecraft. The method comprises mounting a solar array drive assembly to the top side surface of the spacecraft, providing a solar panel array having a center panel, pivotally attaching a first panel to one side edge of the center panel, pivotally attaching a second panel to the other side edge of the center panel opposite the first panel, pivotally attaching the center panel to the solar array drive assembly, positioning the solar panel array against the spacecraft, forming at least one notch in at least one of the side edges of the solar panel array, slidably mounting a frame to the spacecraft around the solar panel array, extending at least one tab from the frame over the solar panel array, releasably restraining the solar panel array with the at least one tab, urging the frame in a direction generally away from the solar array drive assembly, holding the frame against the force of movement, initiating deployment, releasing the hold on the frame, slidably urging the frame in a general direction away from the solar array drive assembly, aligning the at least one notch with the at least one tab, and releasing the solar panel array from against the spacecraft.

The present invention further includes a deployable and tracked solar array mechanism for restraining and releasing deployable solar panel arrays on a spacecraft. The spacecraft has a first side surface, a second side surface, a third side surface opposite the first side surface, a fourth side surface opposite the second side surface, a top surface, and a bottom surface. The mechanism comprises a solar array drive assembly mountable to the top side surface of the spacecraft. A first solar panel array and a second solar panel array are provided with each solar panel array having a center panel, a first panel pivotally attached to one side edge of the center panel, and a second panel pivotally attached to the other side edge of the center panel opposite the first panel. The center panels are pivotally attached to opposite sides of the solar array drive assembly. The first solar panel array positionable against the first side surface and the second solar panel array positionable against the third side surface. A plurality of notches are formed in at least one of the side edges of both the solar panel arrays. A first frame is slidably mounted to the first side surface of the spacecraft around the first solar panel array and a second frame is slidably mounted to the third side surface of the spacecraft around the second solar panel array. A plurality of first tabs extend from the first frame over the first solar panel array with the number of first tabs corresponding to the number of notches on the first solar panel array and the first tabs releasably restraining the first solar panel array. A plurality of second tabs extend from the second frame over the second solar panel array with the number of second tabs corresponding to the number of notches on the second solar panel array and the second tabs releasably restraining the second solar panel array. First spring means urge the first frame in a direction generally away from the solar array drive assembly and second spring means urge the second frame in a direction generally away from the solar array drive assembly. First release means holds the first frame against the force of the first spring means and second release means holds the second frame against the force of the second spring means. Upon initiation of deployment, both the release means disintegrate allowing the both spring means to slidably urge the frames in a general direction away from the solar array drive assembly thereby aligning the notches with the tabs and releasing the solar panel arrays from against the spacecraft.

Another embodiment of the invention is directed to a solar panel array assembly that comprises multiple solar panels that can be folded into a stowed configuration with a relatively low-profile. For example, in the case of a 3 U CubeSat, an embodiment of the solar array assembly can be provided that is comprises three solar panels that can be folded together so as to fit within the 6.5 mm space between one side of the CubeSat and the interior surface of the deployment canister. Each of the three solar panels accommodates seven solar cells. As a consequence, when the solar array assembly is deployed, the assembly provides twenty-one (21) solar cells for power production. If two such solar array assemblies are used, the combined assemblies provide forty-two (42) solar cells for power production. In contrast, the known solar assembly for use with a 3 U CubeSat only provides seven (7) solar cells for a panel associated with one side of the 3 U CubeSat and a total of twenty-eight (28) solar cells for the four panels associated with the four sides of the 3 U CubeSat. Further, the known solar assembly utilizes the spaces between all four sides of the CubeSat and the interior of the canister to store twenty-eight 28 solar cells. In contrast, two of the solar array assemblies utilize the space between two sides of the CubeSat and the interior of the canister to store 42 solar cells. It should be appreciated that, while this embodiment of the solar array assembly has been discussed in the context of an implementation with a 3 U CubeSat satellite, the solar array assembly can be implemented in other situations in which there is a need or desire to increase the density of solar cells that can be stowed or stored within a particular volume or space.

One embodiment of the solar panel array assembly includes a pair of solar panels, a hinge operatively connected to the panels and allowing the panels to rotate with respect to one another, a spring that provides the energy to rotate the panels from a first orientation in which the panels are stacked (or in a stowed configuration) towards a second orientation in which the panels have rotated relative to one another and relative to the first orientation, and a truss structure operatively connected to the first and second panels. The truss structure is capable of being placed in an inoperative state when the panels are stacked/stowed and an operative state when the panels have a desired operational orientation to one another. In the inoperative state, the truss structure has a relatively planar profile that facilitates the low-profile of the stacked/stowed panels. In the operative state, a truss structure is established between the two panels. When the truss structure is in the operative state, the truss structure increases the depth of the structure comprised of the panels and the truss, thereby increasing the stiffness of the overall structure. Due to the stiffness enhancing effect of the truss structure, at least one of the panels can be thinner than a panel that would be used in the absence of the truss structure to attain a desired stiffness. In one embodiment, the truss structure is comprises a flexible strap whose ends are attached to the two panels and a pivotable post that is attached to the flexible strap at a location between the two ends of the strap. In the inoperative state, the strap is folded and disposed substantially parallel to the stacked/stowed panels and the post is pivoted so as to be disposed substantially parallel to the stacked/stowed panels. In the operative state, the post is pivoted so as to be at an angle to the panels and the strap is unfolded such the two portions of the strap between the post and panels are each at an angle to one of the panels. In a specific embodiment in which the panels are unstacked so that the panels are coplanar, the post is substantially perpendicular to the panels and establishes what is known as a King post truss. In a three panel embodiment of the solar array assembly, a Queen post truss can be implemented with two pivoting posts located on the center panel and a strap with ends attached to the two outer panels and intermediate points attached to the two pivoting posts.

Another embodiment of the solar panel array assembly comprises: (a) at least two solar panels, each with a panel and a solar cell supported by the panel, (b) a hinge that is operatively connected to the panels and extends between the panels, (c) a spring that provides the energy to rotate the panels from a first orientation in which the panels are stacked (or in a stowed configuration) towards a second orientation in which the panels have rotated relative to one another and relative to the first orientation. At least one of the panels is a thin panel, i.e., a panel with a pair of parallel faces and a substantially constant density between the faces. Examples of such panels include graphite/carbon-fiber composite panels, fiberglass composite panels, and metal panels (e.g., aluminum panels). These types of panels have a substantially constant density between the faces of the panel. In contrast, honeycomb-core panels have a density that varies between the faces of the panel due to the substantially amount of void space between the faces of the panel. The hinge of the solar array assembly includes a flexible membrane that is connected to and extends between the panels.

Yet a further embodiment of the solar panel array assembly includes: (a) a pair of solar panels, (b) a hinge comprised of two flexible membranes, and (c) a spring that provides the energy to rotate the panels from a first orientation in which the panels are stacked (or in a stowed configuration) towards a second orientation in which the panels have rotated relative to one another and relative to the first orientation. Each of the solar panels has a pair of sides that are substantially parallel to one another and separated from one another by an edge that extends between the sides. One of the two flexible membranes is attached to and extends between corresponding sides of the solar panels and the other flexible membrane is attached to and extends between the other corresponding sides of the solar panels. As such, the portions of the two flexible membranes that extend between the panels and the edges of the two panels define a closed-loop. In one embodiment, this closed-loop is used to prevent potentially undesirable movement of the spring. To elaborate, in a particular embodiment of the assembly, the spring has a U-shaped section that could potentially move from a desired position to an undesired position relative to the panels in the absence of a constraining structure. A portion of the U-shaped section is disposed within the closed loop formed by the membranes and the edges of the panels to prevent this undesired movement of the U-shaped section.

A further embodiment of the solar panel array assembly has at least two solar panels, a hinge, and a torsion bar that is operatively connected to the panels and capable of providing the energy to cause the first and second panels to rotate such that the panels move from a first orientation in which the panels are stacked towards a second orientation in which the panels are no longer stacked. The hinge includes a flexible membrane that is connected to and extends between the panels. In a particular embodiment, the torsion bar includes a U-shaped section with first and second legs connected to one another by a cross-section. The U-shaped section provides the needed spring force in a shorter length than a conventional torsion bar having a relatively straight section between outwardly extending ends that engage the panels. Further, the use of a U-shaped section allows the ends of the torsion bar to be positioned relatively close to one another, thereby reducing any moment created by the operation of the torsion bar and preventing the space between the panels from varying.

BRIEF DESCRIPTION OF THE DRAWINGS

FIG. 1A is a cross-sectional perspective view of the frame, a pair of holding elements attached to the frame, and a pair of tabs;

FIG. 5 is an exploded perspective view illustrating the deployable and tracked solar array mechanism for nano-satellites, constructed in accordance with the present invention, with the solar panel arrays and the spacecraft;

FIG. 6 is a perspective view illustrating the deployable and tracked solar array mechanism for nano-satellites, constructed in accordance with the present invention, with the mechanism mounted to the spacecraft;

FIGS. 16A and 16B respectively are cross-sectional, schematic representations of one of the hinges and associated torsion bar of the assembly shown in FIG. 11 when the solar panel array assembly is in a stacked/stowed configuration and when the solar panel array is in a deployed configuration;

DETAILED DESCRIPTION

Figure 1:
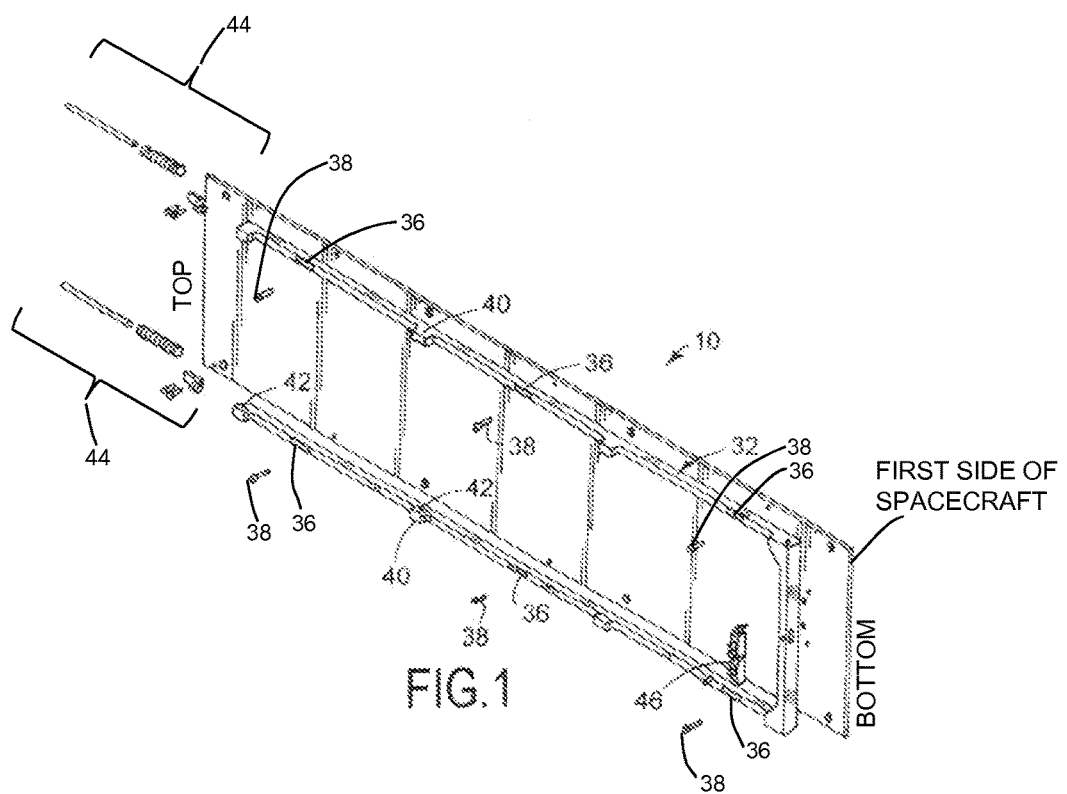
FIG. 1 is an exploded perspective view illustrating a deployable and tracked solar array mechanism for nano-satellites, constructed in accordance with the present invention, for restraining and releasing deployable solar panel arrays on a spacecraft.
Figure 2:
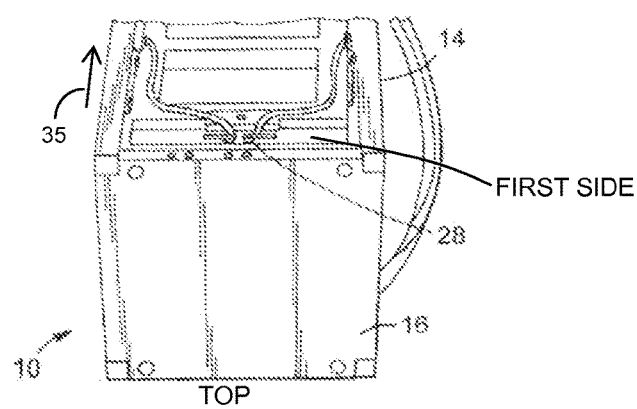
FIG. 2 is a perspective view illustrating the deployable and tracked solar array mechanism for nano-satellites, constructed in accordance with the present invention, with a solar array drive assembly and a root hinge assembly for deploying the solar panel arrays away from the spacecraft.
Figure 3:
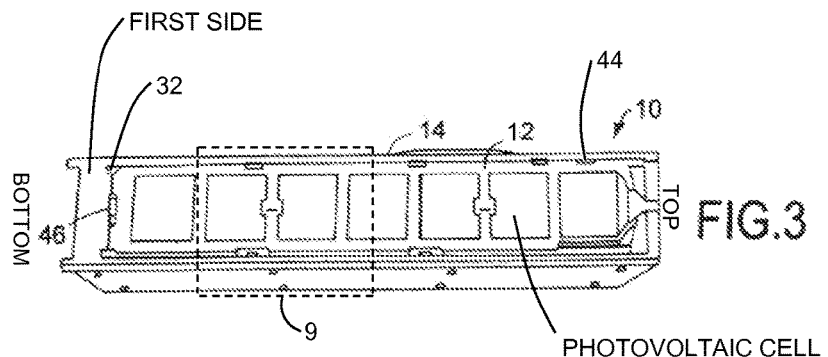
FIG. 3 is a perspective view illustrating the deployable and tracked solar array mechanism for nano-satellites, constructed in accordance with the present invention, with the mechanism mounted to the spacecraft.
Figure 4:
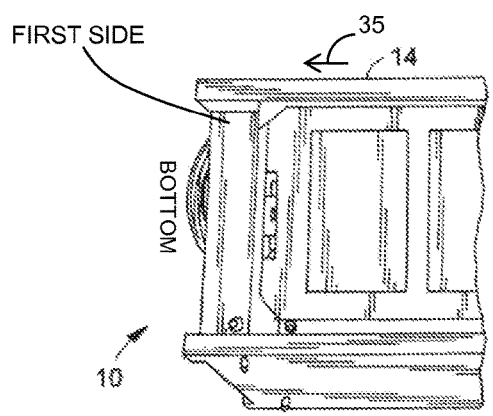
FIG. 4 is another perspective view illustrating the deployable and tracked solar array mechanism for nano-satellites, constructed in accordance with the present invention, with direction of movement upon melting of meltable release pin.

As illustrated in FIGS. 1, 1A, and 2-10, the present invention is a deployable and tracked solar array mechanism, indicated generally at 10, for restraining and releasing deployable solar panel arrays 12 on a spacecraft 14. The spacecraft 14 used with the mechanism 10 of the present invention is preferably a CubeSat spacecraft 14 although using the mechanism 10 on any type of spacecraft 14 is within the scope of the present invention. In addition, preferably, the solar panel arrays 12 are preferably constructed from a thin graphite-based composite panel stiffness and strength although using other types of solar panel arrays 12 is within the scope of the present invention.

The CubeSat spacecraft 14 has a four side surfaces, a top surface, and a bottom surface. Preferably, each side surface is substantially parallel to each opposite side surface and the top surface is substantially parallel to the bottom surface. Mounted on the top surface is a solar array drive assembly 16. The solar array drive assembly 16 is preferably a simple, self-contained, ultra-thin, low-power, stackable single actuator drive system designed to operate on approximately 500 mW of power while articulating the arrays, and less than 1 mW while the actuators and system are inactive. The solar array drive assembly 16 specifically fits in previously wasted payload space, on a typical CubeSat bus, consisting of an approximate 6.5 mm "slice" of the CubeSat bus.

While a specific type of solar array drive assembly 16 has been described for use with the deployable and tracked solar array mechanism 10 of the present invention, it is within the scope of the present invention to utilize any type of solar array drive assembly 16 so long as the solar array drive assembly 16 performs key system functions, rotating the solar panel arrays 12 to keep them optimally oriented with respect to the Sun, and providing a path for power transfer from the solar panel arrays 12 to the CubeSat spacecraft 14.

The solar panel arrays 12 of the deployable and tracked solar array mechanism 10 of the present invention include a first solar panel array 18 and a second solar panel array 20. Each of the first solar panel array 18 and the second solar panel array 20 has a center panel 22, a first panel 24 pivotally attached to one side edge of the center panel 22 with a pivotal attachment 23, and a second panel 26 pivotally attached to the other side edge of the center panel 22 opposite the first panel 24 with a pivotal attachment 23. The center panels 22 of the first solar panel array 18 and the second solar panel array 20 are each pivotally secured to the solar array drive assembly 16 with a root hinge assembly 28, each of which includes one of the mounting fasteners 37A, 37B. The two root hinge assemblies 28 operate to deploy the solar panel arrays 12, as described above. Furthermore, each of the edges of the center panels 22 has a series of spaced notches 30 for allowing deployment of the solar panel arrays 12 with the mechanism 10, as will be described in further detail below.

Prior to deployment, the first solar panel array 18 is wrap-folded against the first side surface of the spacecraft 14 and the second solar panel array 20 is wrap-folded against the third side surface of the spacecraft 14 with the center panels 22 of each of the solar panel arrays 12 facing in a generally outward direction. By positioning the center panels 22 in a generally outward direction, complete string of cells for trickle charging is provided without having to deploy the solar panel arrays 12.

While the solar panel arrays 12, i.e., the first solar panel array 18 and the second solar panel array 20, of the deployable and tracked solar array mechanism 10 of the present invention have been described as being tri-fold with three panels, i.e., a center panel 22, a first panel 24, and a second panel 26, it is within the scope of the present invention for the solar panel arrays 12 to have multiple panels, i.e., more than three, flipping away from each other during deployment. Regardless of the number of panels, when the panels are stored, at least a portion of the center panel 22 faces outward and, when deployed, all of the panels face in a desired position to achieve the tracking and power required for the space mission. Furthermore, regardless of the number of panels, deployment springs 31 are positioned between each of the panels. Preferably, the springs are redundant stainless steel torsion rod springs that unfurl the panels of the solar panel arrays 12 during deployment, as will be described in further detail below.

The deployable and tracked solar array mechanism 10 of the present invention maintains the solar panel arrays 12, i.e., the first solar panel array 18 and the second solar panel array 20, against the spacecraft 14 until deployment is desired. The mechanism 10 further comprises a first frame 32 mounted to the first side surface of the spacecraft 14 and a second frame 34 mounted to the third side surface of the spacecraft 14. Each frame 32, 34 has an end member, a first side member substantially perpendicular and connected to one end of the end member, and a second side member connected to the other end of the end member and substantially parallel to the first side member. A plurality of slots 36 are formed in each of the first side member and second side member with a bolt 38 or other fastening mechanism extending through the slot 36 into the spacecraft 14. The interaction of the slots 36 sliding along the bolts 38 allows deployment of the solar panel arrays 12.

Each of the first side member and the second side member of each frame 32, 34 of the deployable and tracked solar array mechanism 10 of the present invention has a series of holding devices 40 spaced therealong. Each holding device 40 extends in a generally outward direction away from the spacecraft 14 and has a frame tab 42 bending inward at an approximately ninety (90°) degree angle and substantially parallel to the spacecraft 14. Each frame tab 42 of each holding device 40 contacts at least a portion of the edges of the center panels 22 of the solar panel arrays 12 adjacent the notches 30 for holding the solar panel arrays 12 against the spacecraft prior 14 to deployment, as will be described in further detail below.

In addition, the deployable and tracked solar array mechanism 10 of the present invention has a pair of spring mechanisms 44 acting against the first side member and the second side member of each frame 32, 34. Preferably, each spring mechanism 44 is a redundant stainless steel compression spring although using other types of spring mechanisms 44 is within the scope of the present invention.

The deployable and tracked solar array mechanism 10 of the present invention further includes a meltable release pin 46 interacting between the end member of each frame 32, 34 and the spacecraft 14. The release pin 46 maintains the position of each frame 32, 34 relative to the spacecraft 14 against the force of the spring mechanisms 44. When the deployment event is initiated by a command to burn the release pin 46, the disintegration of the release pin 46 allows the spring mechanisms 44 to urge each of the frames 32, 34 in a slidable direction, indicated by arrow 35, opposite the solar array drive assembly 16 along the sides of the spacecraft 14. This type of release event is preferably not instantaneous making the release event low shock and immune from spurious spikes of current due to Electro Static Discharge (ESD). Furthermore, the release pin 46 is lightweight, typically weighing less than one (1) gram, is easy to reset by replacing the release pin 46.

Upon complete movement of the frames 32, 34 of the deployable and tracked solar array mechanism 10 of the present invention, to the movement capacity of the spring mechanisms 44, the notches 30 in the edges of the center panels 22 of the stowed solar panel arrays 12 align with the holding devices 40. Being free from constraint by movement of the frames 32, 34, the spring-powered root hinge 28 interacting with the solar array drive system 16 rotates the solar panel arrays 12 in a general direction away from the first side surface and the third side surface of the spacecraft 14, respectively.

Figure 7:
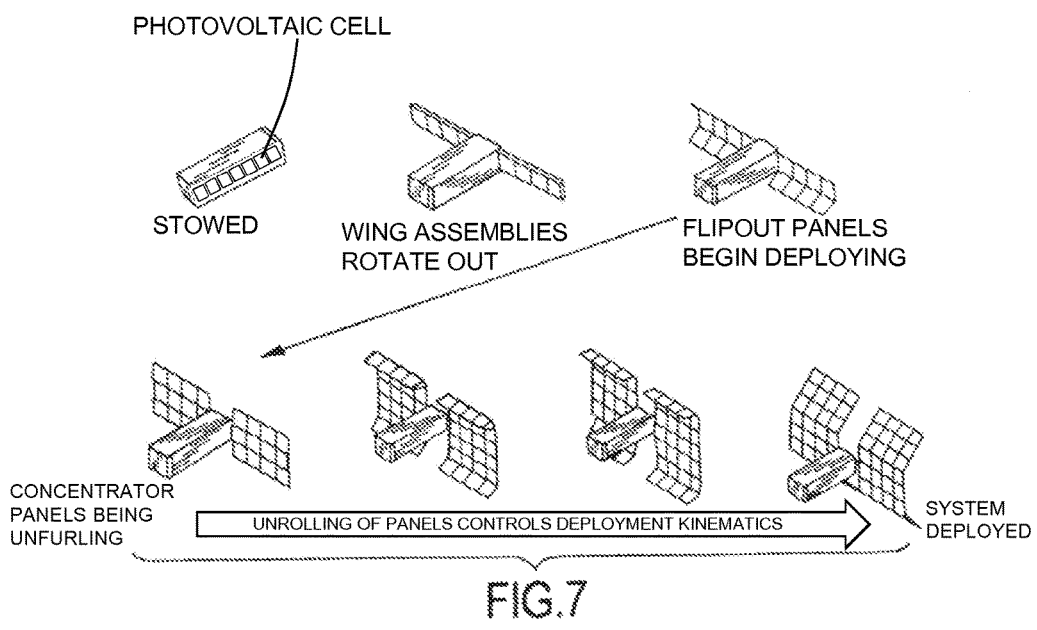
FIG. 7 illustrates a deployment sequence of the solar panel arrays for use with the deployable and tracked solar array mechanism for nano-satellites, constructed in accordance with the present invention.
Figure 8:
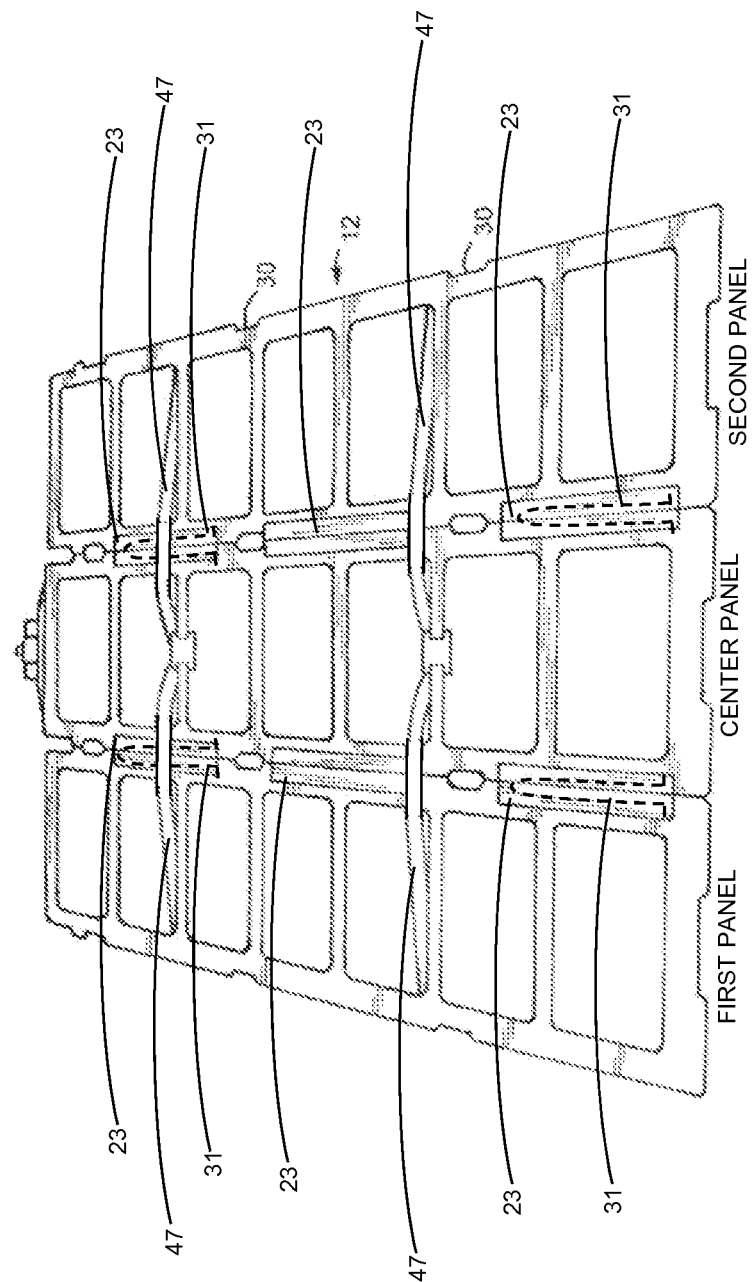
FIG. 8 is a perspective view illustrating the solar panel array for nano-satellites, constructed in accordance with the present invention, with small folded braces deployed on the back sides (non-cell side) of the solar panel array.
Figure 9:
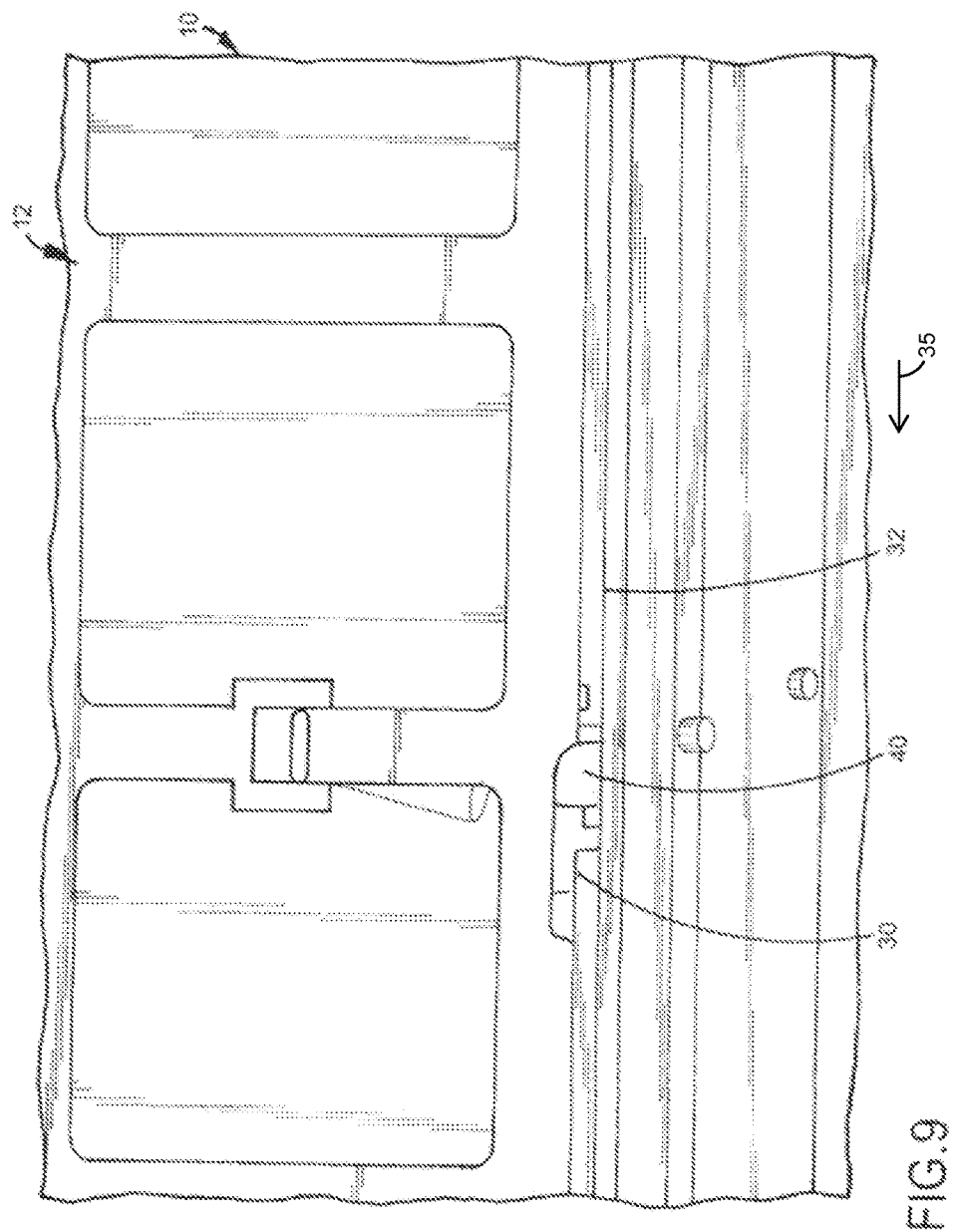
FIG. 9 is a close-up perspective view illustrating a portion of the deployable and tracked solar array mechanism for nano-satellites 9 shown in FIG. 3, constructed in accordance with the present invention.
Figure 10:
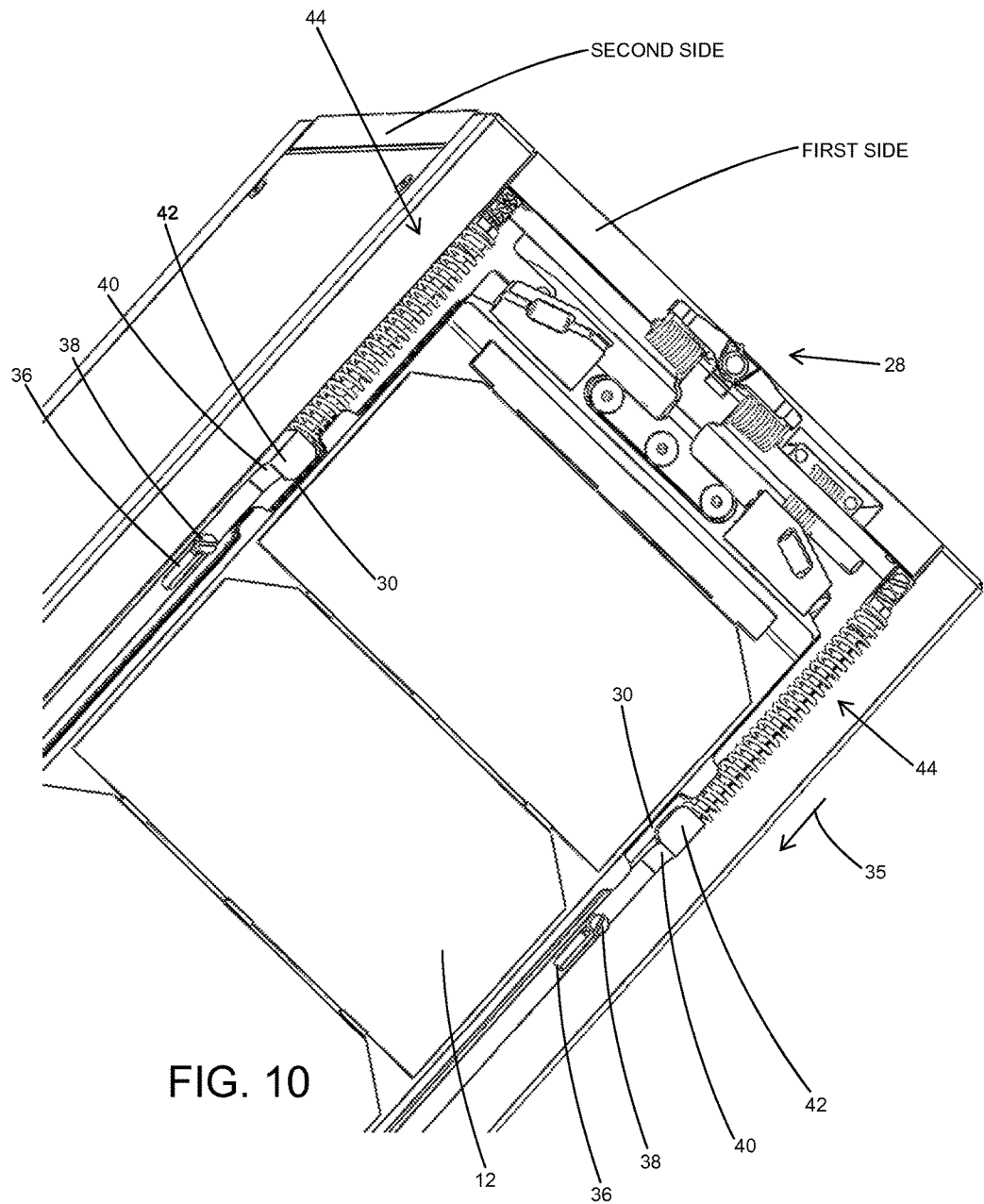
FIG. 10 is a close-up perspective view illustrating a folded solar panel array positioned adjacent to the first side of a nano-satellite, root hinge assembly, spring mechanisms, a portion of the frame that has a pair of tabs and a pair of slots that allow the frame to be slidably mounted to the first side of the nano-satellite, and the tabs of the frame aligned with pairs of notches in the folded solar panel array to allow deployment of the solar panel array (as would occur after the release device has been released to allow the frame to be displaced so the tabs and notches move from an unaligned state to an aligned state)
Figure 11:
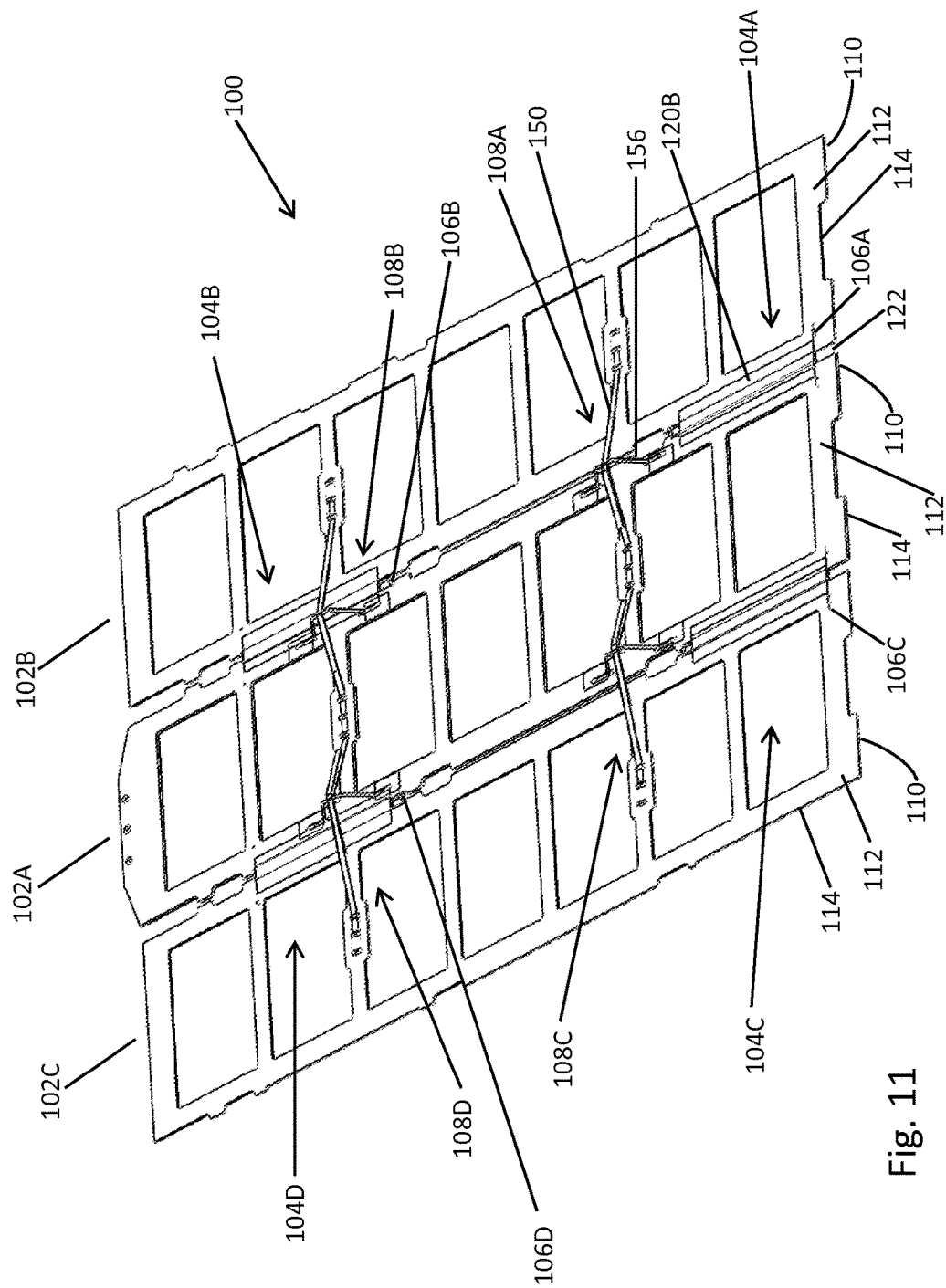
FIG. 11 is a perspective view of an embodiment of a solar panel array assembly.
Figure 12:
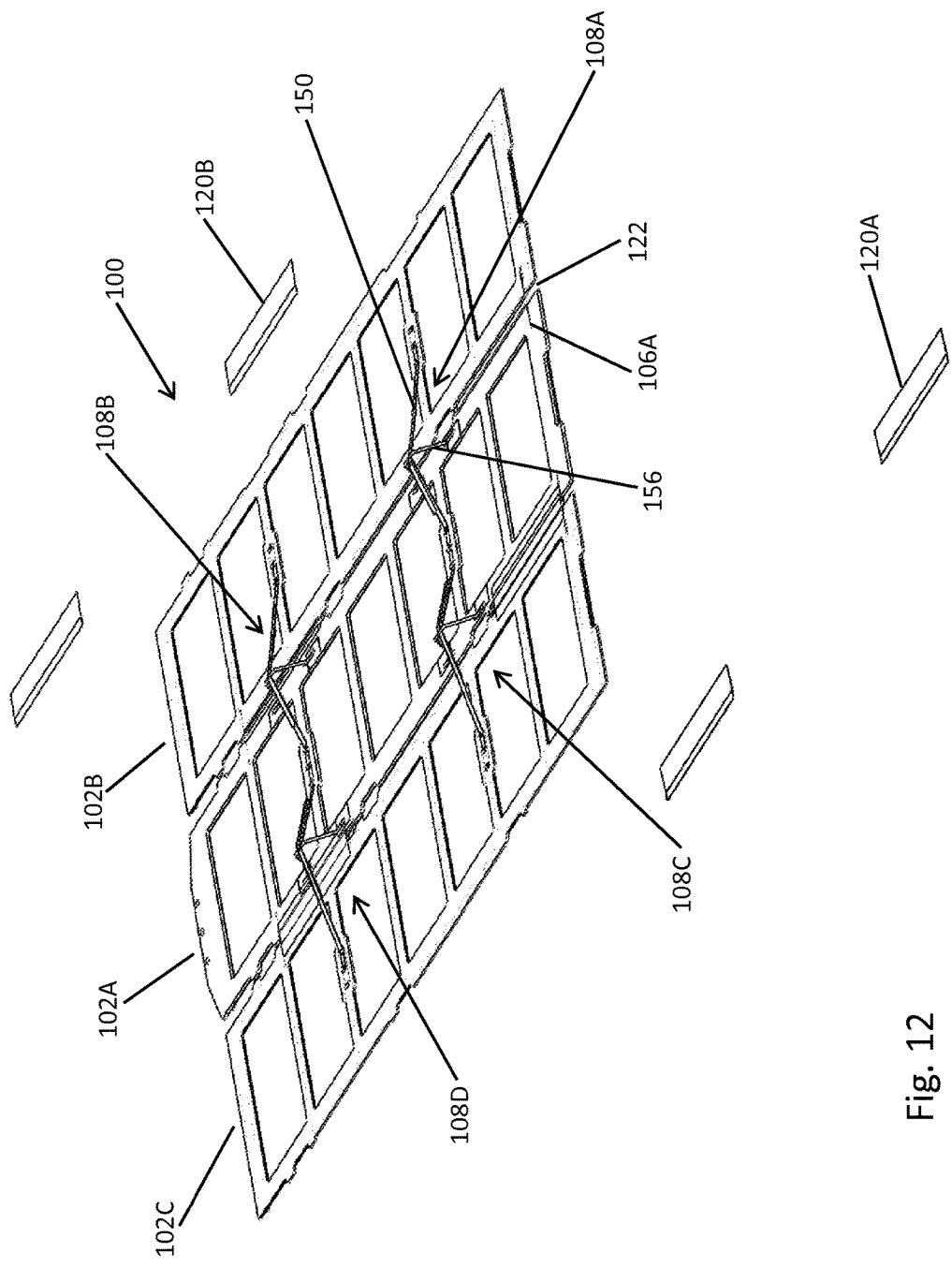
FIG. 12 is a partially exploded view of the solar panel array assembly of FIG. 11 showing the torsion bars that underlie the flexible membranes of two hinges.
Figure 13:
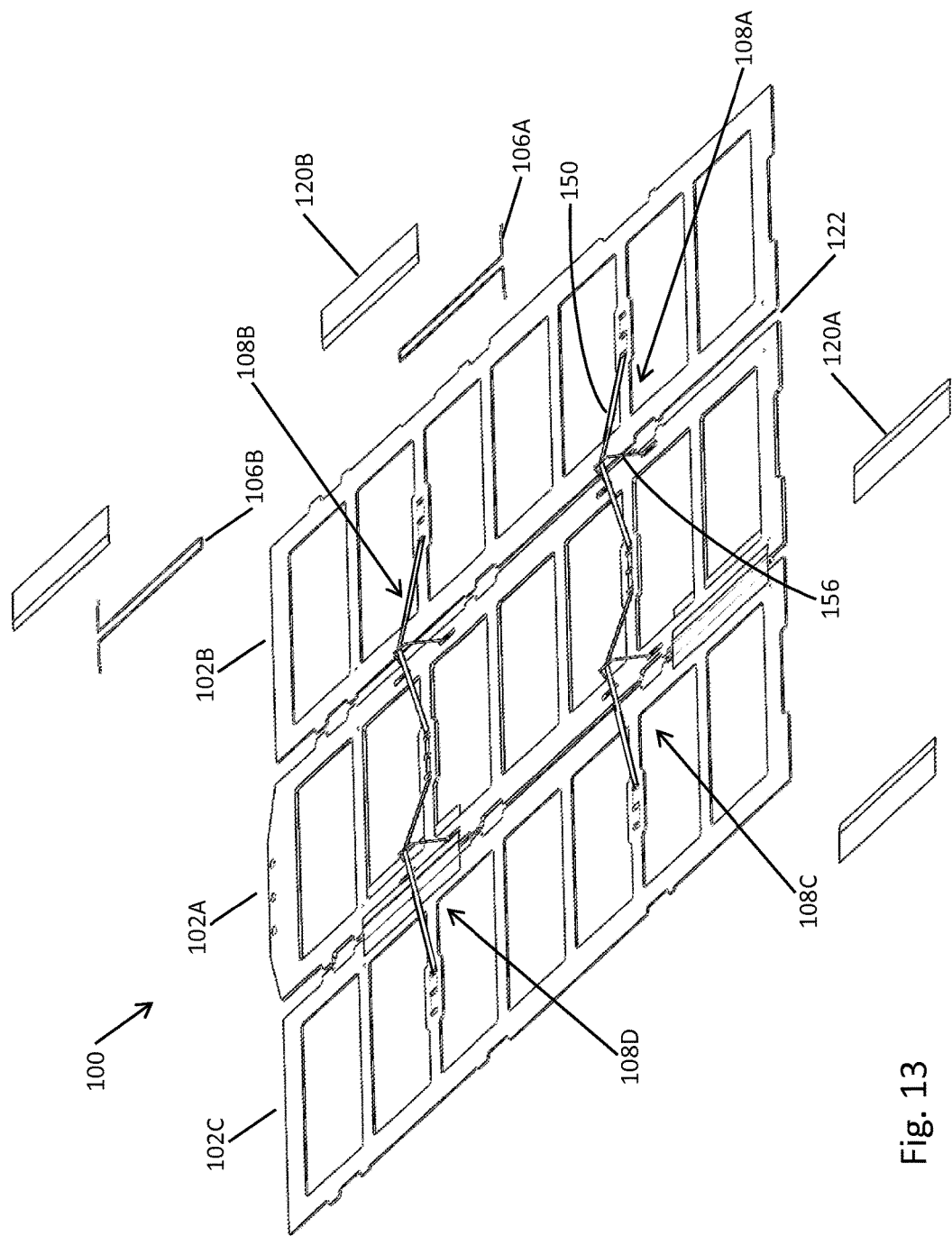
FIG. 13 is a partially exploded view of the solar panel array assembly of FIG. 11 showing the flexible membranes and torsion bars associated with the center panel and one of the side panels.

As the solar panel arrays 12 of the deployable and tracked solar array mechanism 10 of the present invention reach approximately eighty (80°) degrees of deployment rotation from the spacecraft 14, the solar panel arrays 12 begin to unfurl by spring energy. Simultaneously, small folded braces 47 deploy on the back sides (non-cell side) of the solar panel arrays 12 providing the solar panel arrays 12 with deployed stiffness and position accuracy. The preferred deployment sequence for the solar panel arrays 12 is illustrated in FIG. 7.

The deployable and tracked solar array mechanism 10 of the present invention securely and releasably restrains the solar panel arrays 12 during liftoff, flight, and positioning of the spacecraft 14. In addition, the mechanism 10 reliably releases the solar panel arrays 12 for deployment during orbit.

With reference to FIGS. 11-15, an embodiment of a solar panel array assembly 100 (hereinafter "assembly 100") is described. The assembly 100 comprises three panels 102A-102C, seven (7) solar cells (not shown) associated with each of the panels, hinges 104A-104D that allow relative rotation between the panels, springs 106A-106D that provide forces for moving the panels between a stacked/stowed configuration and a deployed configuration, and truss structures 108A-108D that in combination with the panels produce a stiffer structure than the panels could provide in the absence of such a truss and also serve to limit the extent of rotation between the panels.

The panels 102A-102C each have a first side 110 and a second side 112 that is substantially parallel to the first side, and an edge 114 that defines the rectangular shape of the panel. Each of the panels 100A-100C also defines seven holes or voids that serve to reduce the weight of the panel and generally define the location of the seven solar cells. To elaborate, each of the solar cells is attached with an adhesive to the first side 110 of a panel such that the solar cell covers the hole or void. Each of the panels 102A-102C is made from a material that has a substantially constant density between the first side 110 and the second side 112, unlike composite materials that employ honeycomb cores and the like. In the illustrated embodiment, each of the panels is made from a graphite/carbon-fiber composite material. Other materials that can be utilized include fiberglass composite materials (e.g., garolite) and metal (e.g., aluminum). While in the illustrated embodiment each of the panels 102A-102C is made of the same material, it should be appreciated that at least in certain applications two or more of the panels can be made from different materials. For example, one panel can be made from a graphite/carbon-fiber and another panel made from a fiberglass composite material. In the illustrated embodiment, the panel 102A (i.e., the center panel) has a thickness of 1.0 mm and the two side panels 102B, 102C each have a thickness of 0.5 mm.

Each of the solar cells used in the assembly 100 is a SpectroLab high efficiency (28.3%) UTJ triple junction cells that have a thickness of 3-30 mils (0.0762-0.7620 mm). Other solar cells with greater/less efficiency and/or greater/lesser cost can be employed, if needed or desired. Further, if compatible, a selection of different solar cells can be employed in the assembly. It should also be appreciated that each of the panels can be adapted so as to accommodate a different number of solar cells, i.e., at least one solar cell but a number of solar cells other than seven solar cells.

The hinges 104A-104D are each substantially identical to one another. As such, only hinge 104A is described with the understanding that the hinges 104B-104D (although at different locations and, in the case of hinges 104C, 104D extending between different panels) are substantially identical to hinge 104A. The hinge 104A includes a first flexible membrane 120A that is attached to the first sides 110 of panels 102A, 102B and a second flexible membrane 120B that is attached to the second sides 112 of panels 102A, 102B. The first and second flexible membranes 120A, 120B are attached to the panels 102A, 102B so as to define a gap 122 between the panels and to allow rotation of the first and second panels 102A, 102B relative to one another. In the illustrated embodiment, the first and second flexible membranes 120A, 120B associated with the hinges 104A, 104B allow the first and second panels 102A, 102B to be placed in: (a) a stacked or stowed configuration (see, e.g., FIG. 3) in which the panels are substantially parallel to one another but not coplanar with one another and (b) a deployed configuration (see, e.g., FIG. 6) in which the panels are substantially coplanar with one another. The hinges 104C, 104D perform similarly with respect to the panels 102A, 102C.

In the illustrated embodiment, the first and second flexible membranes 120A, 120B are realized with Kapton® tape, which is a polyimide film with an acrylic adhesive located on one side of the film. Kapton® tape is suitable for space-based applications of the assembly 100. The portions of the flexible membranes spanning the gap 122 are typically treated to prevent the first and second flexible membranes 120A, 120B from sticking to one another in the gap 122. Treatment can involve removing the adhesive on the portions of the flexible membranes that are to be disposed across the gap 122 or applying a material to the adhesive on the portions of the flexible membranes that are to be disposed across the gap 122 that prevents these portions from sticking to one another. As another alternative, a flexible membrane without a pre-applied adhesive can be employed. In this case, an adhesive is added to the outer portions of the flexible membrane that are to adhere to a panel, while no adhesive is added to the center portion of the membrane that is to span the gap 122. It should be appreciated that, depending on the application, other types of flexible membranes can be utilized. For example, a flexible woven material, natural fiber material (e.g., paper), or other similar materials known to those skilled in the art can be employed to realize a flexible membrane in the appropriate situations.

Figure 14:
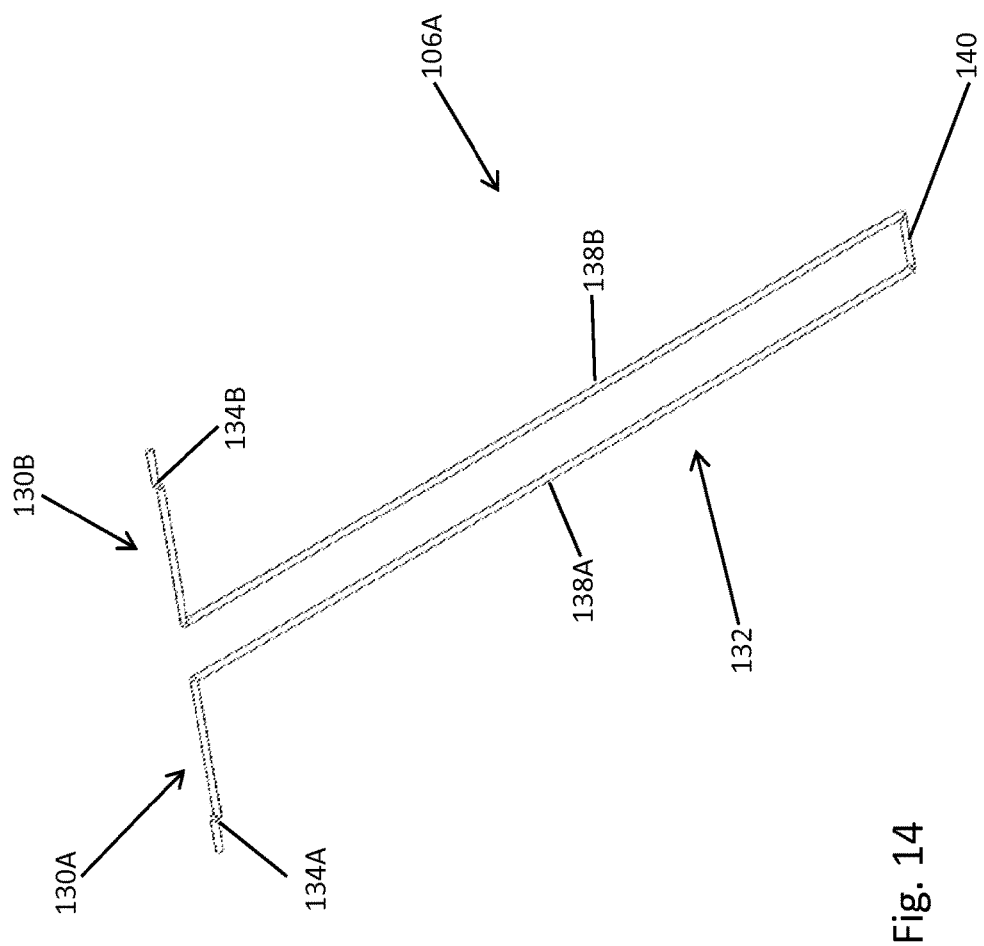
FIG. 14 is a perspective view of one of the torsion bars of the solar panel array assembly of FIG. 11.
Figure 15:
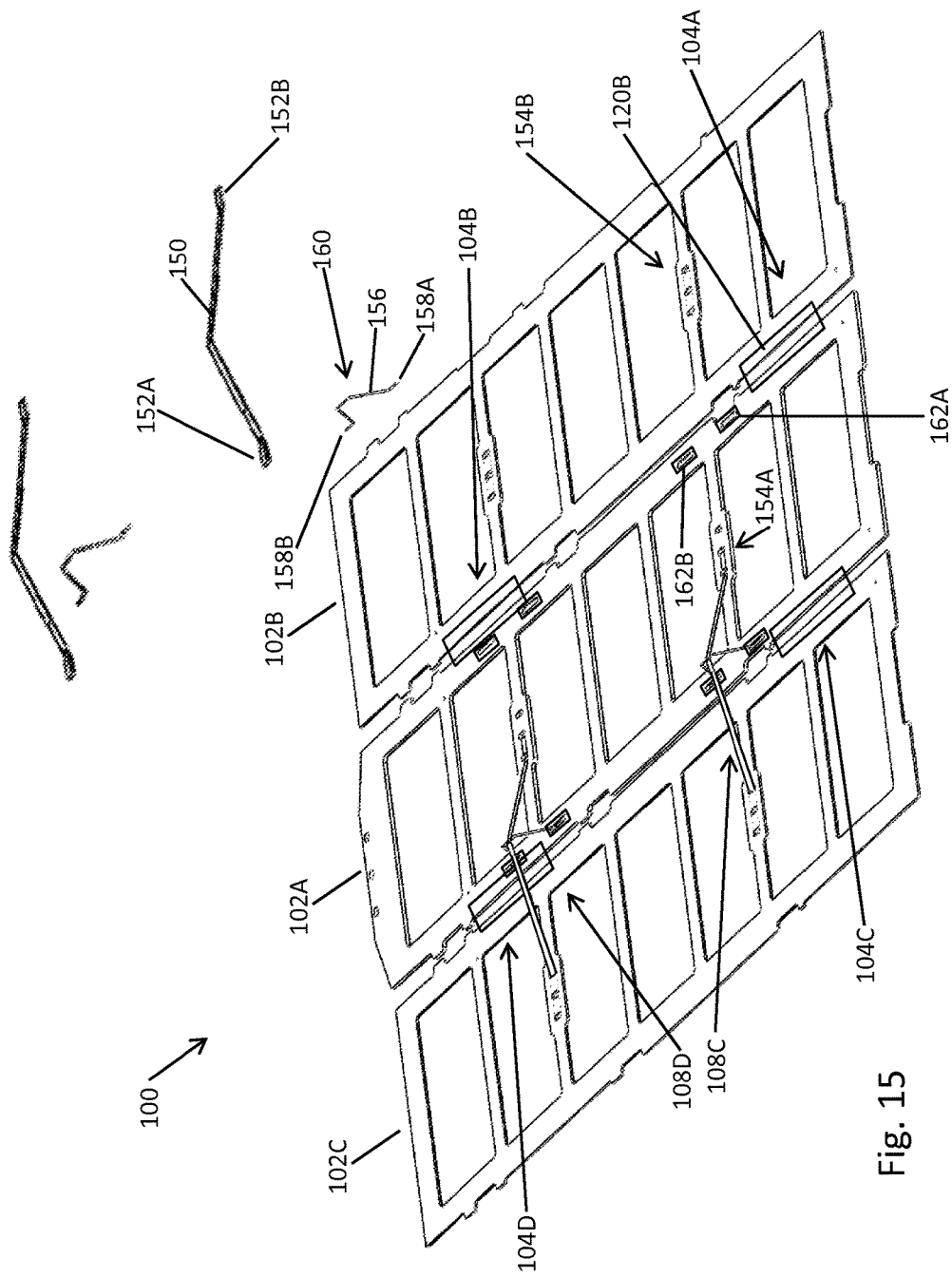
FIG. 15 is a partially exploded view of the solar panel array assembly of FIG. 11 showing the pivoting tower and strap that are used to realize a truss structure.

The springs 106A-106D are each substantially identical to one another. As such, only spring 106A is described with the understanding that the springs 104B-104D (although at different locations and, in the case of springs 106C, 106D extending between different panels) are substantially identical to spring 106A. With reference to FIGS. 14, 16A, and 16B, the spring 106A includes a first and second ends 130A, 130B and a mid-section 132. The first and second ends 130A, 130B respectively have an S-shaped bends 134A, 134B that facilitate the attachment of the spring 106A to the first and second panels 102A, 102B. To elaborate, the S-shaped bend 134A of the first end 130A of the spring 106A is substantially located in a hole 136A established in the first panel 102A, thereby establishing a portion of the first end adjacent to the first side 110 of the first panel 102A and another portion of the first end adjacent to the second side 112 of the first panel 102A. The S-shaped bend 134B of the second end 130B of the spring 106A is substantially located in a hole 136B established in the second panel 102B, thereby establishing a portion of the second end adjacent to the first side 110 of the second panel 102B and another portion of the second end adjacent to the second side 112 of the second panel 102B. The mid-section 132 of the spring 106A is U-shaped with a first leg 138A, second leg 138B, and cross-section 140 connecting the first and second legs. The spring 106A performs as a torsion bar in that energy can be stored by imposing a twist or shear stress upon the first and/or second legs 138A, 138B. The cross-section 140 can also store energy due to the application of bending moments when the panels are in a stacked/stowed configuration, much like a torsion spring. Nonetheless, the first and second legs 138A, 138B, as opposed to the cross-section 140, are believed to store most of the energy that is used in moving the panels from the stacked/stowed configuration towards the deployed configuration. By utilizing a U-shaped mid-section 132, the first and second legs 138A, 138B can be used to store an amount of energy comparable to a torsion bar of twice the length. Additionally, the U-shape mid-section 132 allows the forces applied by the spring 106A to the first and second panels 102A, 102B to be substantially planar. In other embodiments, a torsion bar comprised of a straight or slightly curved mid-section disposed between two ends that extend away from the mid-section to engage the panels may be feasible. However, the use of such a torsion bar is likely to apply an undesirable moment to the panels that adversely affects the position of the panels.

The mid-section 132 of the spring 106A is substantially disposed within a closed-loop formed by the portions of the first and second membranes 120A, 120B spanning the gap 122, the edge of the first panel 102A, and the edge of the second panel 102B. The closed-loop substantially prevents the mid-section 132 of the spring 106A from rotating about an axis substantially extending between the first and second ends 130A, 130B of the spring 106A. Such a rotation, if it were to occur, could adversely affect the ability of the spring 106A to apply the necessary forces to move the panels 102A, 102B from the stacked/stowed configuration towards the deployed configuration. While substantially the entire mid-section 132 of the spring 106A is disposed between the first and second membranes 120A, 120B, it should be appreciated that membranes covering a lesser portion of the mid-section 132 and not necessarily overlying one another can be employed. Further, if the spring 106A were likely to only rotate in one direction, only one of the membranes 120A, 120B may be needed to prevent such a rotation.

In the illustrated embodiment, the springs 106A-106D are in a pre-loaded state when the panels are in a stacked/stowed configuration, i.e., the springs 106A-106D are storing the energy needed to rotate the panels 102B, 102C relative to panel 102A from the stacked/stowed configuration to the deployed configuration. In a particular embodiment, the springs 106A-106D are storing more energy than is expected to be needed to rotate the panels from the stacked/stowed configuration to the deployed configuration. In the illustrated embodiment, each of the springs 106A-106D is made from stainless steel and has a cross-sectional diameter of 0.38 mm. Springs made of other materials, different cross-sectional shapes, and different cross-sectional dimensions can be utilized The truss structures 108A-108D are each substantially identical to one another. As such, only truss structure 108A is described with the understanding that the truss structures 108B-108D (although at different locations and, in the case of truss structures 108C, 108D extending between different panels) are substantially identical to truss structure 108A. The truss structure 108A includes a flexible strap 150 with a first end 152A that is attached to the first panel 102A and a second end 152B that is attached to the second panel 102B. More specifically, the first end 152A of the strap passes through a series of holes 154A established in the first panel 102A and is additionally attached to the panel using an appropriate adhesive, which in the case of space-based application is likely to be an acrylic adhesive. The second end 152B of the strap passes through a series of holes 154B established in the second panel 102B and is additionally attached to the panel with an adhesive. The flexible strap 150 is capable of being folded such that the strap lies substantially in a plane that is parallel to the first and second panels 102A, 102B when the panels are in the stacked/stowed configuration. In the illustrated embodiment, the flexible strap 150 is made of Kapton® tape. Flexible straps made of different materials and/or have different structures are feasible, including metal wires, fabric wire, and chain-like structures to name a few.

The truss structure 108A also includes a tower 156 that is pivotally attached to the first panel 102A and to the flexible strap 150 at a location 157 between the first and second ends 152A, 152B. The tower 156 has first and second ends 158A, 158B and a U-shaped mid-section 160 located between the first and second ends 158A, 158B. The first and second ends 158A, 158B are respectively attached to the first panel 102A by tapes 162A, 162B that allow the tower 156 to rotate so as to be disposed in a plane substantially parallel to the first and second panels 102A, 102B when the panels are in a stacked/stowed configuration and in an upright position when the panels are in a deployed configuration. Typically, the tapes 162A, 162B are pieces of Kapton® tape. In one embodiment, the flexible strap 150 is realized with two pieces of Kapton® tape that are adhering to one another and that sandwich a portion of the U-shaped mid-section 160 of the tower 156 at location 157 to attach the tower 156 to the strap 150. In the illustrated embodiment, the tower 156 is made of stainless steel wire with a diameter of 0.38 mm. Other materials with different cross-sectional shapes and dimensions are also feasible.

FIG. 16A is a schematic, cross-sectional view of panels 102A, 102B, membranes 120A, 120B, and spring 106A when the panels 102A, 102B are in a stowed/stacked configuration where the panels are substantially parallel to one another but not co-planar to one another. The dimensions of certain of these elements have been changed in an effort to clearly show the relationship of the various elements. FIG. 16B is a schematic, cross-sectional view of the panels 102A, 102B, membranes 120A, 120B, and spring 106A when the panels 102A, 102B are in a deployed configuration where the panels 102A, 102B are substantially co-planar with one another. Additionally, the closed-loop formed by the membranes 120A, 120B and the edges 114 of the first and second panels 102A, 102B is shown enclosing the mid-section 132 of the spring 106A and thereby preventing rotation of the spring.

Figures 17A, 17B, 17C:
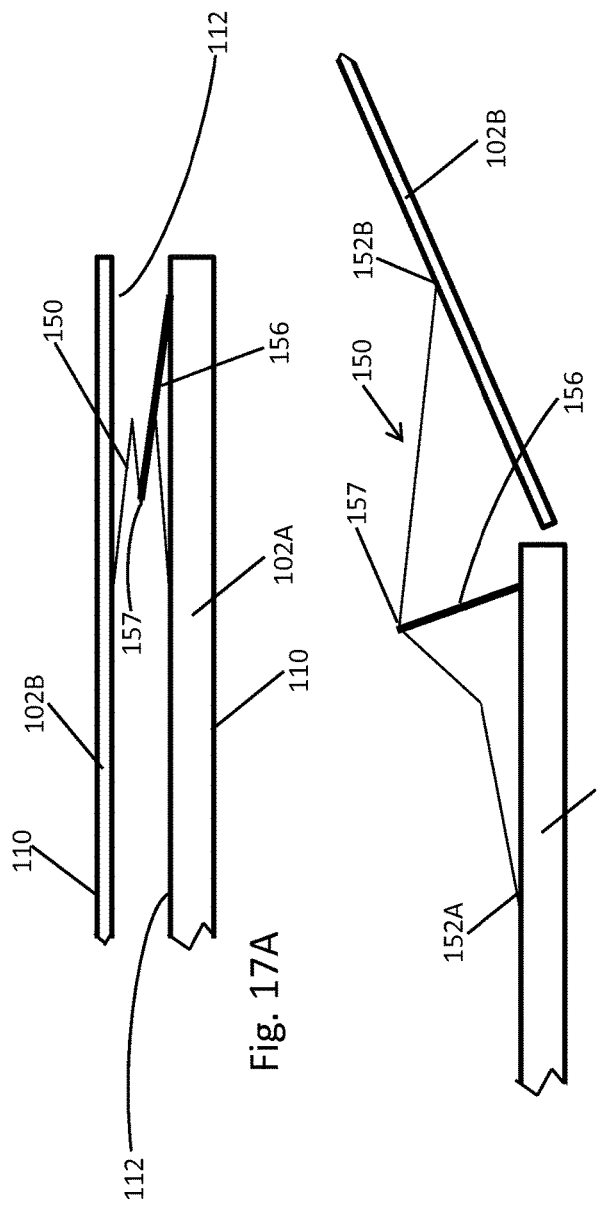
FIG. 17A-17C are schematic representations of the truss structure of the assembly shown in FIG. 11 when the solar panel assembly is in a stacked/stowed configuration, between the stacked/stowed configuration and a deployed configuration, and in a deployed configuration.

FIG. 17A is a schematic, cross-sectional view of panels 102A, 102B, the flexible strap 150, and tower 156 when the panels 102A, 102B are in a stowed/stacked configuration where the panels are substantially parallel to one another but not co-planar to one another. The dimensions of certain of these elements have been changed in an effort to clearly show the relationship of the various elements. Notably, the flexible strap 150 and the tower 156 lie in a plane that is substantially parallel to the panels 102A, 102b. FIG. 17B schematically shows the flexible strap 150 unfolding and the tower 156 moving toward a more upright position as the panels 102A, 102B transition from the stowed/stacked configuration towards the deployed configuration due to the forces being produced by springs 106A, 106B. FIG. 17C schematically illustrates the flexible strap 150 unfolded and the tower 156 in an operative upright position when the panels 102A, 102B are in the deployed configuration. At this point, the flexible strap 150 and tower 156 form a truss between the first and second panels 102A, 102B that adds to the depth of the combined structure of the truss and the panels, thereby increasing the stiffness of the combined structure beyond that of the panels in the absence of a truss. Additionally, the truss prevents further rotation between the panels 102A, 102B due to more energy being stored in the springs 106A, 106B than is necessary for the transition between the stowed/stacked configuration and the deployed configuration. As such, even when the panels are in the deployed configuration, the springs 106A, 106B are still storing some potential energy and this potential energy keeps the flexible strap 150 in tension to prevent the truss from collapsing and maintain the noted stiffness of the combined structure.

Figure 18:
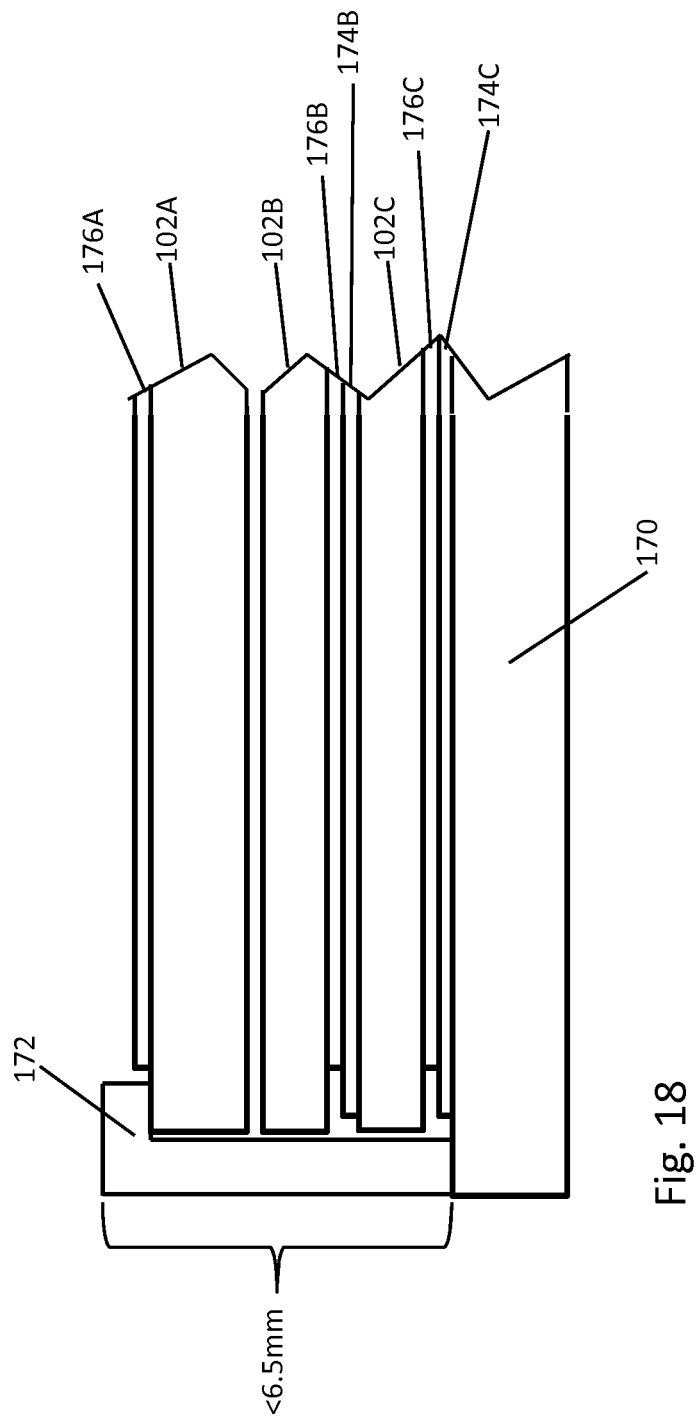
FIG. 18 schematically illustrates the solar panel array of FIG. 11 in a stowed configuration on the side of a spacecraft and with a portion of the holding device that retains the solar panel array in the stowed configuration.

FIG. 18 schematically illustrates the panels 102A-102C in a stowed configuration adjacent to a side 170 of a spacecraft and a portion of a frame 172 that is used to hold the panels 120A-102C adjacent to the side of the spacecraft. Notably, the distance between the side 170 of the spacecraft and the furthest point of the frame 172 from the side 170 is no more than 6.5 mm. In the stowed configuration, foam panels 174B, 174C are respectively disposed adjacent solar cells 176B, 176C respectively associated with the panels 102B, 102C to protect the solar cells from damage. Because solar cell 176A associated with the panel 102A does not interface with another structure of the assembly 100, there is no foam panel associated with this solar cell. The foam panels 174B, 174C typically fall away from the solar cells during the transition of the panels 102A-102C from the stowed/stacked configuration to the deployed configuration or shortly after the deployed configuration is attained. In stowed configuration, the panels 102A-102C are wrap folded with the two outer panels 102B, 102C folding over the center panel 102A. It should be appreciated that the solar panel assembly 100 can be adapted to other folding schemes, including an accordion fold and a combination of wrap and accordion folds. Further, the solar panel assembly 100 can be adapted for use with two panels or for use with more than three panels.

It should be appreciated that the truss structure, while shown as being utilized with non-honeycomb type panels can be used with honeycomb panels of a lesser thickness than would be required in the absence of a truss structure.

The foregoing description of the invention is intended to explain the best mode known of practicing the invention and to enable others skilled in the art to utilize the invention in various embodiments and with the various modifications required by their particular applications or uses of the invention.

What is claimed is:

1. A solar panel array assembly comprising:
a first solar panel having a first panel and at least one solar cell supported by the first panel;
a second solar panel having a second panel and at least one solar cell supported by the second panel;
a hinge operatively connected to and extending between the first panel and the second panel, the hinge allowing the first and second panels to rotate relative to one another about a hinge axis and over a range extending from a first orientation in which the first and second panels are substantially parallel to one another and non-coplanar with one another to a second orientation in which the first and second panels have rotated relative to one another;
a spring having a first end operatively connected to the first panel and a second end operatively connected to the second panel, the spring adapted to provide energy for use in causing the first and second panels to rotate relative to one another so as to move from the first orientation towards the second orientation; and
a truss structure operatively connected to the first and second panels, the truss structure adapted so as to be able to transition from an inoperative state when the first and second panels are in the first orientation and an operative state when the panels are in the second orientation;
the truss structure comprising a tower and a flexible strap structure;
the tower extending from a pivot axis location to a strap engagement location that is spaced from the pivot axis location, the tower pivotally connected to the first panel such that the tower can pivot about a tower pivot axis that is substantially parallel to the hinge axis;
the flexible strap structure extending from a first strap end to a second strap end, the first strap end operatively attached to the first panel at a first attachment location and the second strap end operatively attached to the second panel at a second attachment location;
the flexible strap structure having a tower engagement section located between the first strap end and the second strap end, the tower engagement section operatively attached to the strap engagement location of the tower;
wherein, when the truss structure is in the inoperative state and the first and second panels are in the first orientation, the tower and flexible strap structure are disposed between the first and second panels, the pivot axis location of the tower is located a first distance from the first panel, and the strap engagement location is at a second distance from the first panel;
wherein, during a transition of the first and second panels from the first orientation to the second orientation, (a) the flexible strap structure applies a force to the tower that causes the tower to rotate about the tower pivot axis; (b) the pivot axis location of the tower remains at the first distance from the first panel, and (c) the strap engagement location of the tower moves away from the first panel;
wherein, upon completion of the transition of the first and second panels from the first orientation to the second orientation, (a) the pivot axis location of the tower is at the first distance from the first panel (b) the strap engagement location of the tower is located at a third distance from the first panel that is greater than the second distance, (c) a first longitudinal axis associated with a first portion of the flexible strap structure extends between the first attachment location associated with the first panel and the strap engagement location associated with the tower, the first longitudinal axis intersecting the first panel, (d) a second longitudinal axis associated with a second portion of the flexible strap structure extends between the second attachment location associated with the second panel and the strap engagement location associated with the tower, the second longitudinal axis intersecting the second panel.

2. A solar panel array assembly, as claimed in claim 1, wherein:
one of the first and second panels is a thin panel with: (a) a first face, (b) a second face that is substantially parallel to the first face, (c) a continuous, closed-loop, outer edge that extends between the first and second faces and defines an entire outer lateral extent of the thin panel, and (d) one of (1) no holes extending from the first face to the second face and (2) one or more holes extending from the first face to the second face with each such hole extending from the first face to the second face being defined by a continuous, closed-loop, inner edge, and (e) a constant density throughout a volume with boundaries defined by the first and second faces, the continuous, closed-loop, outer edge, and any continuous, closed-loop, inner edges.

3. A solar panel array assembly, as claimed in claim 2, wherein:
the thin panel is one of a (a) a graphite/carbon-fiber composite panel, (b) a fiberglass composite panel, and (c) a metal panel.

4. A solar panel array assembly, as claimed in claim 2, wherein:
the thin panel is no more than 1.0 mm thick.

5. A solar panel array assembly, as claimed in claim 1, wherein:

the hinge comprises a flexible membrane that comprises one of: (a) a polyimide film, (b) woven material, and (c) a natural fiber material.

6. A solar panel array assembly, as claimed in claim 1, wherein:

the hinge comprises an adhesive operatively associated with at least a portion of a flexible membrane.

7. A solar panel array assembly, as claimed in claim 1, wherein:

the spring comprises a torsion bar having (a) a cross-section that extends from a first cross-section end to a second cross-section end and has a medial section located between the first and second cross-section ends, (b) a first leg that extends between a pair of first leg ends and has a first longitudinal axis extending between the pair of first leg ends, (c) a second leg that extends between a pair of second leg ends and has a second longitudinal axis extending between the pair of second leg ends, (d) a first end member and (e) a second end member;

wherein (1) the first cross-section end is connected to a first leg end of the pair of first leg ends, (2) the second cross-section end is connected to a second leg end of the pair of second leg ends, (3) the other first leg end of the pair of first leg ends is connected to the first end member, and (4) the other second leg end of the pair of second leg ends is connected to the second end member;

wherein (1) the first end member is operatively connected to the first panel and (2) the second end member is operatively connected to the second panel;

wherein, in the first orientation, (1) the first and second longitudinal axes of the first and second legs are substantially parallel to the hinge axis, (2) the medial section has a curved shape, (3) the cross-section, from the first cross-section end to the second cross-section end, forms less than a complete loop;

wherein, in the second orientation, (1) the first and second longitudinal axes of the first and second legs are substantially parallel to the hinge axis, (2) the medial section has a less curved shape than in the first orientation, (3) the cross-section, from the first cross-section end to the second cross-section end, forms less than a complete loop, (4) the first longitudinal axis of the first leg, second longitudinal axis of the second leg, and the cross-section collectively have a U-like shape.

* * * * *